United States Patent [19]

Koike

[11] Patent Number: 5,440,583
[45] Date of Patent: Aug. 8, 1995

[54] DECISION FEEDBACK EQUALIZER WITH SECOND-ORDER RECURSIVE FILTER CONTROLLED WITH TWO FEEDBACK COEFFICIENTS

[75] Inventor: Shin'ichi Koike, Tokyo, Japan

[73] Assignee: NEC Corporation, Tokyo, Japan

[21] Appl. No.: 110,989

[22] Filed: Aug. 24, 1993

[30] Foreign Application Priority Data

Aug. 24, 1992 [JP] Japan .................. 4-223707
Feb. 26, 1993 [JP] Japan .................. 5-038250

[51] Int. Cl.[6] .................. H03H 7/30; H03H 7/40
[52] U.S. Cl. .................. 375/233; 375/348; 375/350; 364/724.17; 364/724.2
[58] Field of Search .................. 375/11, 14, 15, 16, 375/36, 101, 103; 364/724.17, 724.2, 724.01; 333/28 R

[56] References Cited

U.S. PATENT DOCUMENTS

| 4,539,690 | 9/1985 | Speidel | 375/14 |
| 5,293,402 | 3/1994 | Crespo et al. | 375/14 |
| 5,297,166 | 3/1994 | Batruni | 375/14 |

OTHER PUBLICATIONS

"Pole-Zero Decision Feedback Equalization with a Rapidly Converging Adaptive IIR Algorithm" by Pedro M. Crespo et al., IEEE Journal on Selected Areas in Communications, vol. 9, No. 6, Aug. 91, pp. 817–829.

Primary Examiner—Stephen Chin
Assistant Examiner—Amanda T. Le
Attorney, Agent, or Firm—Sughrue, Mion, Zinn, Macpeak & Seas

[57] ABSTRACT

An input digital signal is applied to a subtractor where the intersymbol interference component of the signal is removed by a cancelling signal and the ISI-free signal is fed to a decision circuit to produce a binary output, from which a decision error is then detected. A greater part of the cancelling signal is generated by a nonrecursive filter connected to the decision circuit and the remainder is generated by a second-order recursive filter whose tapped delay line is connected through an adder to the output of the tapped delay line of the nonrecursive filter. The tap signals of the recursive filter are respectively multiplied with first and second feedback coefficients and applied to the adder as feedback signals. The first feedback coefficient is equal to a sum of an attenuation constant of constant value ($r_f$) and an attenuation coefficient of variable quantity (r) and the second feedback coefficient is equal to a product of the two attenuation coefficients. The variable quantity attenuation coefficient is adaptively updated by a correlation between the decision error and a signal derived from the output of the recursive filter.

3 Claims, 4 Drawing Sheets

TO CORRELATOR 33

DECISION FEEDBACK EQUALIZER WITH SECOND-ORDER RECURSIVE FILTER CONTROLLED WITH TWO FEEDBACK COEFFICIENTS

BACKGROUND OF THE INVENTION

1. Field of the Invention

The present invention relates to a decision feedback equalizer for suppressing intersymbol interference in the context of digital baseband communications over subscriber loops.

2. Description of the Related Art

In a conventional digital baseband transmission system using a metallic cable, a transformer is used at each end of the system for inductively coupling a data source to one end of the cable and a data sink to the other end of the cable for purposes of insulation and power feeding. Since the low frequency components of the signals transmitted are cut off by the transformers, the channel impulse response exhibits a waveform having a long tail following an impulse of transmitted energy. Such a long tail is the potential source of undesirable intersymbol interference. Decision feedback equalization has been in widespread use for suppressing intersymbol interference in the context of high-speed digital communications. A decision feedback equalizer currently in use comprises a subtractor to which an input digital signal is applied and in which the intersymbol interference component of the signal is compensated for by subtracting from it the output of a nonrecursive, finite impulse response filter. A binary decision is made on the output of the subtractor by a decision circuit to produce a logical 1 or 0 by comparison with a threshold value and a decision error is detected and the tap gains of the nonrecursive filter are updated with correlations between the decision error and the tap signals of the filter. However, a large number of delay taps is required for the complete elimination of intersymbol interference component with a long, gradually decaying tail.

U.S. Pat. No. 5,084,865, S. Koike, describes an echo canceller comprising a nonrecursive filter and a first-order recursive filter. However, in transmission systems where transformers are provided one for each end of a transmission line, the receiving end of the line suffers from the second-order effect of the lowpass cut-off characteristic of the transmission line that arises from the transformer at the transmit end. The use of the first-order recursive filter is inadequate for complete elimination of a long tail portion of intersymbol interference.

The use of a second-order recursive filter in addition to a nonrecursive filter is disclosed in a paper "Pole-Zero Decision Feedback Equalization with a Rapidly Converging Adaptive IIR Algorithm", P. M. Crespo et al, IEEE Journal on Selected Areas in Communications, Vol. 9, No. 6, Aug. 1991, pages 817–829. In this publication, two coefficients of variable quantity are involved in the IIR algorithm. However, because of the use of more than one coefficient of variable quantity the proposed IIR algorithm is complex and difficulty will be encountered in implementing the IIR algorithm.

SUMMARY OF THE INVENTION

It is therefore an object of the present invention to provide a decision feedback equalizer with a simplified second-order recursive filter.

Another object of the present invention is to provide a decision feedback equalizer in which the second-order recursive filter is controlled with two feedback coefficients derived from transmit and receive attenuation coefficients.

The present invention is based on the fact that the operating characteristics of the transformer at the receive site can be usually known at the time of designing a decision feedback equalizer, whereas those of the transformer at the transmit site may be hidden in a black box. The decision feedback equalizer having a second-order recursive filter of the present invention is suitable for a transmission system where second order low-pass cutoff characteristics are involved under such circumstances. In a practical aspect, the cut-off frequency of a receiver at the data sink, where the decision feedback equalizer is used, is usually known, while that of the transmitter at the data source may not. According to the present invention, the number of parameters to be taken into the design consideration of the decision feedback equalizer is reduced to one by treating the low-pass cutoff characteristics of the receive-site transformer as constant and those at the transmit site as variable. Recursive algorithm simplification and hence circuit simplification can be achieved by the reduction of the design parameters.

According to a broader aspect of the the present invention, there is provided a decision feedback equalizer comprising a subtractor having a first input for receiving an input digital signal and a second input for receiving a cancelling signal for cancelling an intersymbol interference component of the input digital signal, and on the output of the subtractor a decision is made by a decision circuit to produce a binary output signal. An error detector is connected to the decision circuit for detecting a decision error. A nonrecursive filter is provided, which includes a tapped delay line having an input end connected to the output of the decision circuit for producing a succession of nonrecursive tap signals, tap-gain multipliers for operating on the nonrecursive tap signals respectively, and means for summing the outputs of the tap-gain multipliers and producing an output signal of the nonrecursive filter. Correlations between the nonrecursive tap signals and the decision error are detected for controlling the tap gains of the tap-gain multipliers of the nonrecursive filter. A recursive filter is provided, which includes a tapped delay line having first and second delay-line taps, first and second tap-gain multipliers for respectively operating on the inputs of the first and second delay-line taps of the recursive filter, means for summing the outputs of the first and second tap-gain multipliers of the recursive filter and producing an output signal of the recursive filter, third and fourth tap-gain multipliers for respectively operating on the outputs of the first and second delay-line taps of the recursive filter. The outputs of the third and fourth tap-gain multipliers of the recursive filter are summed with the output of the tapped delay line of the nonrecursive filter and applied to the input end of the tapped delay line of the recursive filter in feedback loops. Correlations between the inputs of the first and second delay-line taps of the recursive filter and the decision error are detected for controlling the tap gains of the first and second tap-gain multipliers of the recursive filter.

The lowpass cutoff characteristics of a transformer at the receive site are represented by an attenuation coefficient of constant value and those of the transformer at the transmit site are represented by an attenuation coefficient of variable quantity which is updated with a correlation between the decision error and a signal derived from the output of the recursive filter. The attenuation coefficient of constant value is summed with the attenuation coefficient of variable quantity to produce a first feedback coefficient and the attenuation coefficient of constant value is multiplied with the attenuation coefficient of variable quantity to produce a second feedback coefficient. By using the first and second feedback coefficients, the tap gains of the third and fourth tap-gain multipliers are respectively controlled. The output signals of the nonrecursive filter and the recursive filter are summed together and supplied to the second input of the subtractor as the cancelling signal.

According to a first specific aspect of the present invention, the first and second feedback coefficients are derived from a second recursive filter which includes a tapped delay line having first and second delay-line taps, first and second tap-gain multipliers for respectively operating on the outputs of the first and second delay-line taps of the second recursive filter. The outputs of the first and second tap-gain multipliers of the second recursive filter are summed with the output of the tapped delay of the first-mentioned recursive filter and applied to an input end of the tapped delay line of the second recursive filter. The output of the second delay-line tap of the second recursive filter is weighted with the attenuation coefficient of constant value and subtracted from the output of the first delay-line tap of the second recursive filter to produce an output signal of the second recursive filter. The output signal of the second recursive filter is used as a signal for detecting the correlation with the decision error to produce the attenuation coefficient of variable quantity. The first and second tap-gain multiplier of the second recursive filter are controlled according to the first and second feedback coefficients, respectively.

According to a second aspect of the present invention, the first and second feedback coefficients are derived from a circuit that includes a first multiplier for weighting the output of the second delay-line tap of the first recursive filter with the attenuation coefficient of constant value, a subtractor for subtracting the output of the first multiplier from the output of the first delay-line tap of the first recursive filter, and a second multiplier for weighting the output of the subtractor with the correlation with which the tap gain of the first tap-gain multiplier of the first recursive filter is controlled. The output signal of the second multiplier is used as a signal for detecting the correlation with the decision error to derive the attenuation coefficient of variable quantity.

BRIEF DESCRIPTION THE DRAWINGS

The present invention will be described in further detail with reference to the accompanying drawings, In which.

DETAILED DESCRIPTION

Figure 1:
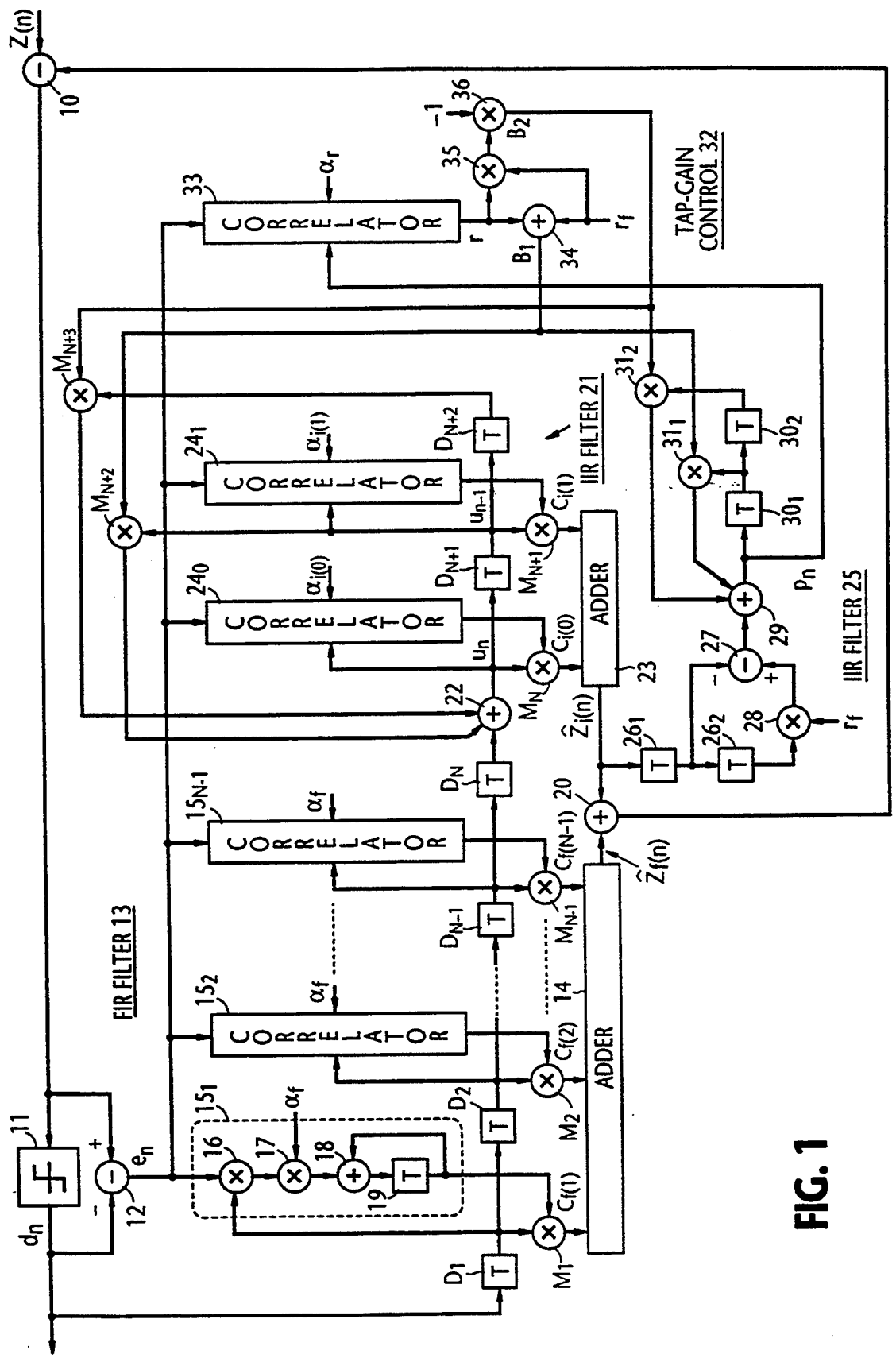
FIG. 1 is a block diagram of a decision feedback equalizer according to one embodiment of the present invention.

Referring now to FIG. 1, there is shown a decision feedback equalizer (DFE) according to the first embodiment of this invention. The DFE includes a subtractor 10 to which an input digital signal $Z_n$ from a transmission line, not shown, is applied. The output of subtractor 10 is applied to a decision circuit 11 where a binary decision is made on the output of the subtractor to produce an output signal $d_n$ at one of two discrete logical values depending on the magnitude of the subtractor output relative to a predetermined threshold value. A decision error $e_n$, which may occur In the decision process, is detected by an error detector 12.

A nonrecursive (FIR) filter 13 includes an N-stage shift register (delay line) formed by a series of delay-line taps $D_1-D_N$ each introducing a symbol delay time T to produce a succession of tap signals along the delay-line taps. Tap-gain multipliers $M_1-M_{N-1}$ are connected respectively to the input of delay-line taps $D_2-D_N$ to weight the tap signals with a respective tap-gain (weight) value. The weighted tap signals are summed by an adder 14 to produce a cancelling signal $Z_{f(n)}$ which represents an estimate of the greater part of the intersymbol interference component of the input signal $Z_n$. The tap gain values of the FIR filter are obtained by identical correlators $15_1-15_{N-1}$. As represented by correlator $15_1$, each correlator $15_k$ includes a first multiplier 16 that performs a vector multiplication on the decision error $e_n$ and the respective tap signal $d_{n-k}$, a second multiplier 17 that performs a scaler multiplication of the output of multiplier 16 with a correction value $\alpha_f$. As a result, each correlator $15_k$ produces a tap-gain control signal given by:

$$C_{f(k)}^{(n+1)} = C_{f(k)}^{(n)} + \alpha_f e_n d_{n-k} \quad (1)$$

where n is the indicator of the successively delayed tap signals. The output of multiplier 17 is summed with the output of a delay unit 19 with a symbol delay time T. The output of delay unit 19 of each correlator $15_k$ is connected to the tap-gain control input of the corresponding tap-gain multiplier $M_k$.

The output signal of FIR filter 13 is obtained at the output of adder 14 and applied to an adder 20 where it is summed with the output signal of a second-order recursive (IIR) filter 21. This IIR filter comprises an adder 22 that combines the output of delay unit $D_N$ of the FIR filter 13 with the outputs of tap-gain multipliers $M_{N+2}$ and $M_{N+3}$ of the IIR filter and feeds a two-stage shift register forming delay-line taps $D_{N+1}$ and $D_{N+2}$ having symbol delay time T. Tap-gain multipliers $M_N$ and $M_{N+1}$ are connected respectively to the input of delay-line taps $D_{N+1}$ and $D_{N+2}$. Correlators $24_0$ and $24_1$, identical in configuration to correlators 15, are provided respectively for the tap-gain multipliers $M_N$ and $M_{N+1}$. Each correlator $24_j$ (where j=0, 1) detects a correlation between the decision error $e_n$ and the corresponding tap signal $u_{(n-j)}$ of the IIR filter 21 using a correction value $\alpha_{i(j)}$ and produces a tap-gain control signal $C_{i(j)}$, where j=1, 0. The tap-gain control signals $C_{i(0)}$ and $C_{i(1)}$ are respectively applied to the control input of tap-gain multipliers $M_N$ and $M_{N+1}$ for weighting the tap signals $u_{(n)}$ and $u_{(n-1)}$. The outputs of tap-gain multipliers $M_N$ and $M_{N+1}$ are summed by an adder 23 and combined with the output of the FIR filter 13 by adder 20. The output of adder 20 is supplied to the subtractor 10 as an overall cancelling signal to compensate for the intersymbol interference component of the input digital signal $Z_n$.

On the other hand, the tap signals $u(n-1)$ and $u(n-2)$ from delay-line taps $D_{N+1}$ and $D_{N+2}$ are respectively coupled to the tap-gain multipliers $M_{N+2}$ and $M_{N+3}$ where they are respectively weighted by feedback tap-gain values $B_1$ and $B_2$ so that adder 23 produces a cancelling signal $Z_{i(n)}$ which represents the remainder of the intersymbol interference component These feedback tap-gain values are given by the following relations:

$$B_1 = r_f + r \quad (2)$$

$$B_2 = -r_f \times r \quad (3)$$

where $r_f$ is an attenuation coefficient of constant value representing the the lowpass cut-off characteristic of the transformer at the receive site and r is an attenuation coefficient of variable quantity representing the lowpass cut-off characteristic of the transformer at the transmit site. This variable quantity is adaptively updated according to the transmitter's lowpass cut-off characteristic in a manner to be described. Therefore, the tap signal $u_n$ of the second-order IIR filter 21 is given by:

$$\begin{aligned} u_n &= d_{n-N} + B_1 u_{n-1} + B_2 u_{n-2} \\ &= d_{n-N} + (r_f + r)u_{n-1} - r_f \cdot r u_{n-2} \end{aligned} \quad (4)$$

Since the decision error $e_{i(n)}$ associated with the IIR filter 21 is given by:

$$e_{i(n)} = Z_{i(n)} - \hat{Z}_{i(n)} \quad (5)$$

where $Z_{i(n)}$ is the intersymbol interference associated with the IIR filter 21 and $\hat{Z}_{i(n)}$ is a replica or estimate of the intersymbol interference and is represented by:

$$\hat{Z}_{i(n)} = C_{i(0)} u_n + C_{i(1)} u_{n-1} \quad (6)$$

Partially differentiating $e_{i(n)}^2$ with respect to $C_{i(0)}$ yields:

$$\frac{\partial e_{i(n)}^2}{\partial C_{i(0)}} = 2e_{i(n)} \frac{\partial e_{i(n)}}{\partial C_{i(0)}} = -2e_{i(n)} \frac{\partial \hat{Z}_{i(n)}}{\partial C_{i(0)}} = -2e_{i(n)} u_n \quad (7)$$

The tap-gain control signal $C_{i(0)}$ of the IIR filter 21 is therefore given as follows:

$$C_{i(0)}^{(n+1)} = C_{i(0)}^{(n)} + \alpha_{i(0)} e_n u_n \quad (9)$$

Likewise, the tap-gain control signal $C_{i(1)}$ of the IIR filter 21 is derived by partially differentiating $e_{i(n)}^2$ with respect to $C_{i(1)}$ as follows:

$$C_{i(1)}^{(n+1)} = C_{i(1)}^{(n)} + \alpha_{i(1)} e_n u_{n-1} \quad (10)$$

On the other hand, partially differentiating $e_i(n)^2$ with respect to r gives:

$$\frac{\partial e_{i(n)}^2}{\partial r} = 2e_{i(n)} \frac{\partial e_{i(n)}}{\partial r} = -2e_{i(n)} \frac{\partial \hat{Z}_{i(n)}}{\partial r} \quad (11)$$

$$= -2e_{i(n)} \left( C_{i(0)} \frac{\partial u_n}{\partial r} + C_{i(1)} \frac{\partial u_{n-1}}{\partial r} \right)$$

Since $$\begin{aligned} \frac{\partial u_n}{\partial r} &= \frac{\partial B_1}{\partial r} u_{n-1} + B_1 \frac{\partial u_{n-1}}{\partial r} + \frac{\partial B_2}{\partial r} u_{n-2} + B_2 \frac{\partial u_{n-2}}{\partial r} \\ &= u_{n-1} - r_f \cdot u_{n-2} + B_1 \frac{\partial u_{n-1}}{\partial r} + B_2 \frac{\partial u_{n-2}}{\partial r} \end{aligned} \quad (12)$$

the following relations hold:

$$C_{i(0)} \frac{\partial u_n}{\partial r} = \quad (13)$$
$$C_{i(0)}(u_{n-1} - r_f \cdot u_{n-2}) + B_1 \cdot C_{i(0)} \frac{\partial u_{n-1}}{\partial r} + B_2 \cdot C_{i(0)} \frac{\partial u_{n-2}}{\partial r}$$

$$C_{i(1)} \frac{\partial u_{n-1}}{\partial r} = \quad (14)$$
$$C_{i(1)}(u_{n-2} - r_f \cdot u_{n-3}) + B_1 \cdot C_{i(1)} \frac{\partial u_{n-2}}{\partial r} + B_2 \cdot C_{i(1)} \frac{\partial u_{n-3}}{\partial r}$$

Summing Equations (13) and (14) to produce a sum and setting it as P n as follows:

$$P_n \triangleq C_{i(0)} \frac{\partial u_n}{\partial r} + C_{i(1)} \frac{\partial u_{n-1}}{\partial r} \quad (15)$$

Thus, $$\begin{aligned} P_n &= (C_{i(0)} \cdot u_{n-1} + C_{i(0)} \cdot u_{n-2}) - \\ &\quad r_f(C_{i(0)} \cdot u_{n-2} + C_{i(1)} \cdot u_{n-3}) + \\ &\quad B_1 \cdot P_{n-1} + B_2 \cdot P_{n-2} \\ &= \hat{Z}_{i(n-1)} - r_f \cdot \hat{Z}_{i(n-2)} + B_1 \cdot P_{n-1} + B_2 \cdot P_{n-2} \end{aligned} \quad (16)$$

From Equations (11) and (16) the coefficient of variable quantity attenuation coefficient r is given by the following recurrence algorithm:

$$r^{(n+1)} = r^{(n)} + \alpha_r e_n P_n \quad (17)$$

where $\alpha_r$ is an update coefficient.

In order to realize Equation (16), the DFE of this embodiment includes an IIR filter 25 and a feedback tap-gain control circuit 32. The IIR filter 25 includes a series of two period-T delay-line taps $26_1$ and $26_2$ connected to the output of IIR filter 21 to produce a succession of tap signals $\hat{Z}_{i(n-1)}$ and $\hat{Z}_{i(n-2)}$ at the output of delay-line taps $26_1$ and $26_2$. The output of delay-line tap $26_2$ is multiplied by the attenuation coefficient $r_f$ by a multiplier 28 and applied to a subtractor 27 where it is subtracted from the output of delay-line tap $26_1$. The output of subtractor 27 is applied to an adder 29 where it is summed with the outputs of multipliers $31_1$ and $31_2$ and applied to a series of period-T delay-line taps $30_1$ and $30_2$ to produce a succession of tap signals $P_n$ and $P_{n-1}$ which are weighted respectively with the feedback tap-gain values $B_1$ and $B_2$ and fed back to adder 29.

The output of IIR filter 25 is taken from adder 29 and supplied to correlator 33 where correlation is detected according to Equation (17).

Figure 2:
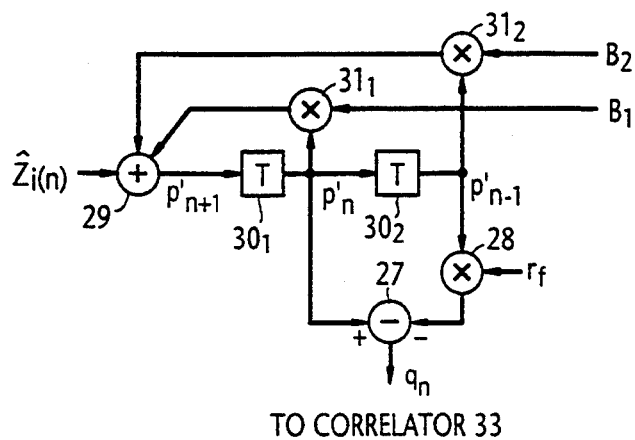
FIG. 2 is a block diagram of a simplified form of the IIR filter of FIG. 1.

Because of the linear, time-invariant system of the digital circuitry, the IIR filter 25 can be simplified as shown in FIG. 2 by eliminating the delay-line taps $26_1$ and $26_2$ and coupling the subtractor 27 and multiplier 28 to the output of delay-line taps $41_1$ and $41_2$, respectively. In this simplified form, the output signal $q_n$ of the IIR filter 25 and the output signal $P_{n+1}$ of the adder 29 are given by:

$$q_n = P'_n - r_f P'_{n-1} \tag{18}$$

$$P'_{n+1} = Z_{i(n)} + B_1 \cdot P'_n + B_2 \cdot P'_{n-1} \tag{19}$$

The coefficient of variable quantity attenuation coefficient $r^{(n)}$ from correlator 33 is given by:

$$r^{(n+1)} = r^{(n)} + \alpha_r e_n q_n \tag{20}$$

The feedback tap-gain controller 32 includes a correlator 33, where a correlation between the output of IIR filter 25 and the decision error $e_n$ is detected, using the update coefficient $\alpha_r$, according to Equation (7). A signal $r^{(n)}$ representing the receiver's attenuation coefficient of variable quantity is thus generated and applied to an adder 33 where it is summed with the constant $r_f$ to produce the feedback tap-gain value $B_1$, which is applied to the multipliers $M_{N+2}$ and $30_1$. The signal $r^{(n)}$ is further applied to a multiplier 34 where it is weighted by the constant $r_f$ to produce an output signal $\{r^{(n)}r_f\}$, which is multiplied by $-1$ in a multiplier 35 to produce the feedback tap-gain value $B_2$ that is applied to the tap-gain multipliers $M_{N+3}$ and $30_2$.

Figure 3:
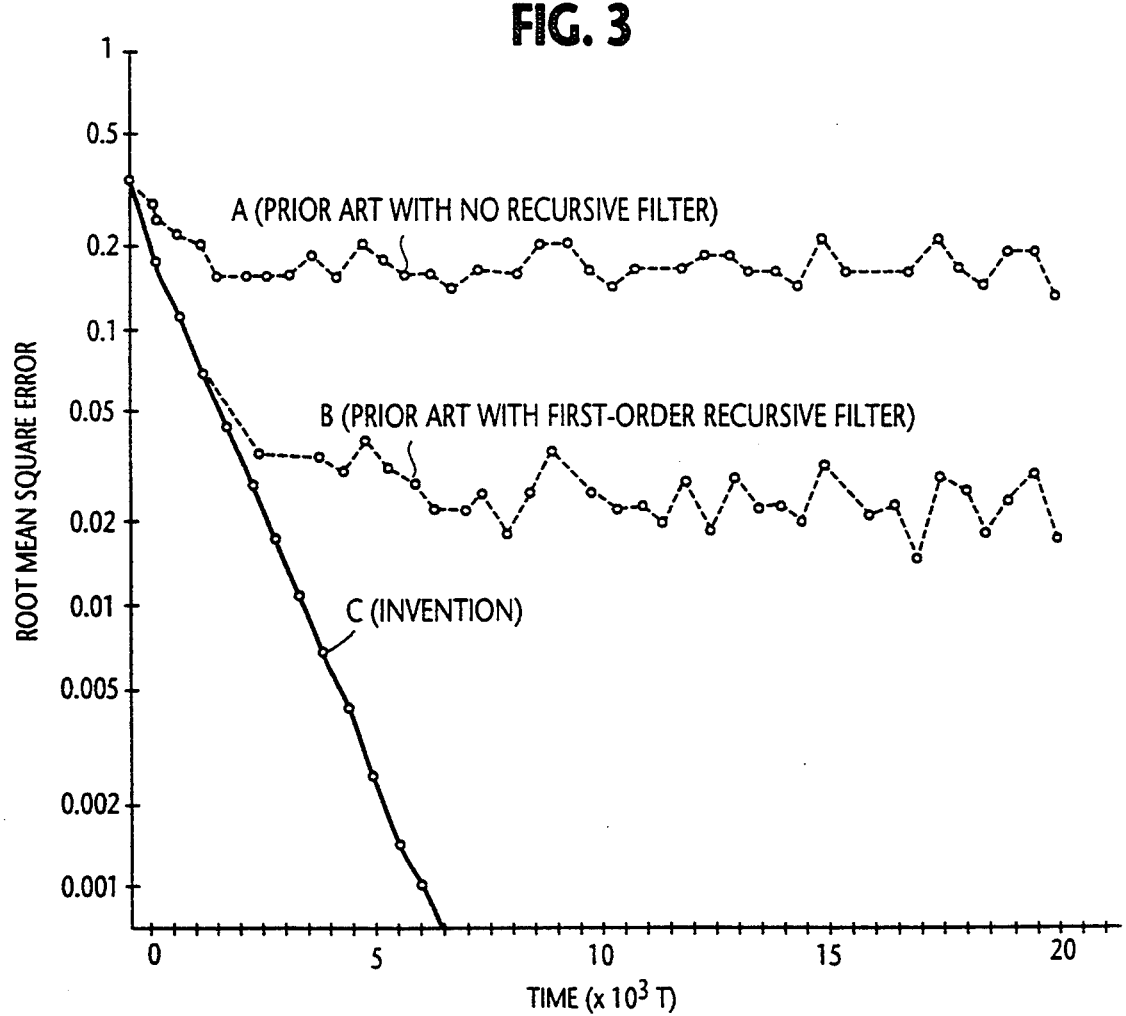
FIG. 3 is a graphic representation of computer simulations for comparison of the root mean square error (residual intersymbol interference) of the embodiments of FIGS. 1 and 2 with prior art decision feedback equalizers.

FIG. 3 represents the residual intersymbol interference of the DFE of FIGS. 1 and 2 as a root-mean-square error (RMSE) obtained by a computer simulation. Curve A is a plot obtained by a prior art decision feedback equalizer having no second-order recursive filter, and curve B is obtained by a prior art decision feedback equalizer having a first-order recursive filter. In either of the simulation results of the prior art, substantial amount of RMSE values remains indefinitely. Whereas, as indicated by curve C, the RMSE value obtained by the first embodiment of the present invention converges in a short period of time.

The recurrence formula implemented by the IIR filter 25 can be further simplified at the expense of an increase in convergence time if such the increased convergence time is tolerable. This is achieved by assuming that the tap signals $u_{n-1}$ and $u_{n-2}$ contain no signal component that corresponds to the output $r^{(n)}$ of correlator 32 and partially differentiating $e_n^2$ with respect to $r^{(n)}$. Since the decision error $e_n$ is written as:

$$e_n = Z_n - d_n - Z_{f(n)} - C_{i(0)}{}^{(n)} u_{(n)} - C_{i(1)}{}^{(n)} u_{(n-1)} \tag{21}$$

the following relations hold:

$$\frac{\partial e_n^2}{\partial r^{(n)}} = 2 e_n \frac{\partial e_n}{\partial r^{(n)}} = -2 e_n \frac{\partial u_n}{\partial r^{(n)}} C_{i(0)}^{(n)} \tag{22}$$

$$= -2 e_n (u_{n-1} - r_f \cdot u_{n-2}) C_{i(0)}^{(n)}$$

-continued $$r^{(n+1)} = r^{(n)} + \alpha_r e_n (u_{n-1} - r_f u_{n-2}) C_{i(0)}^{(n)} \tag{23}$$

$$= r^{(n)} + \alpha_r e_n q'_n$$

where $q'_n = (u_{n-1} - r_f u_{n-2}) C_{i(0)}{}^{(n)}$.

Figure 4:
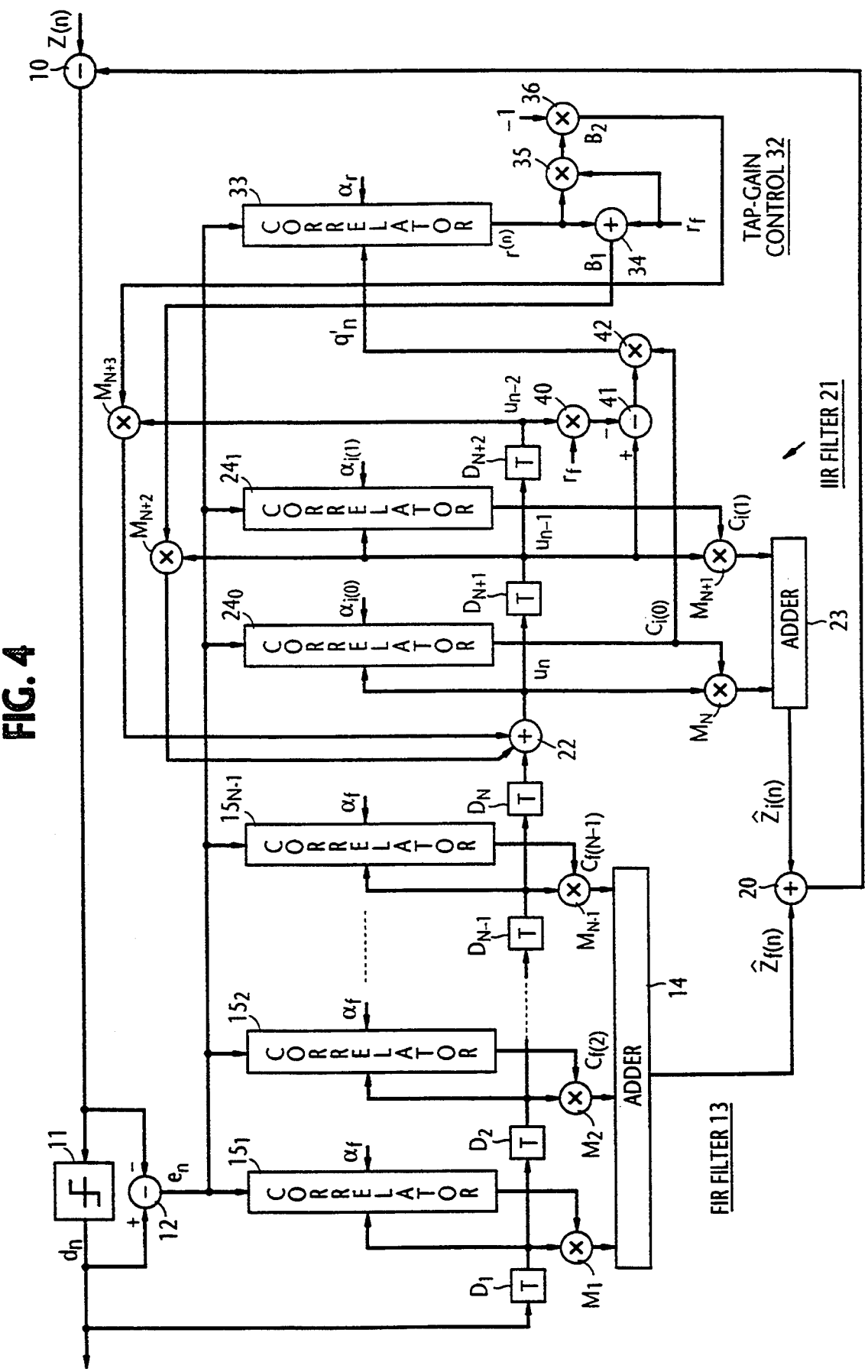
FIG. 4 is a block diagram of a decision feedback equalizer according to a further modification of the present invention.

As shown in FIG. 4, the signal $p'_n$ of Equation (23) is derived from a circuit comprising a multiplier 40, a subtractor 41 and a multiplier 42. By using the multiplier 40 the tap signal $u_{n-2}$ from delay-line tap $D_{N+2}$ is weighted with the constant $r_f$ and then applied to subtractor 41 where it is subtracted from the tap signal $u_{n-1}$ that appears at the output of delay-line tap $D_{N+1}$. The output of subtractor 40 is weighted with the tap-gain value $C_{i(0)}$ by multiplier 42 to produce the output signal $P''_n$. The output of multiplier 42 is applied to the correlator 32 where the correlation with the decision error $e_n$ is detected to recursively generate the attenuation coefficient of variable quantity $r^{(n)}$.

In the foregoing description, the decision error $e_n$ in the recurrence algorithms of Equations (6) and (10) can be replaced with a sign value $SGN(e_n)$. Additionally, in Equation (1) a sign value $SGN(C_{i(0)}{}^{(n)})$ can be used Instead of the value $C_{i(0)}{}^{(n)}$.

Figure 5:
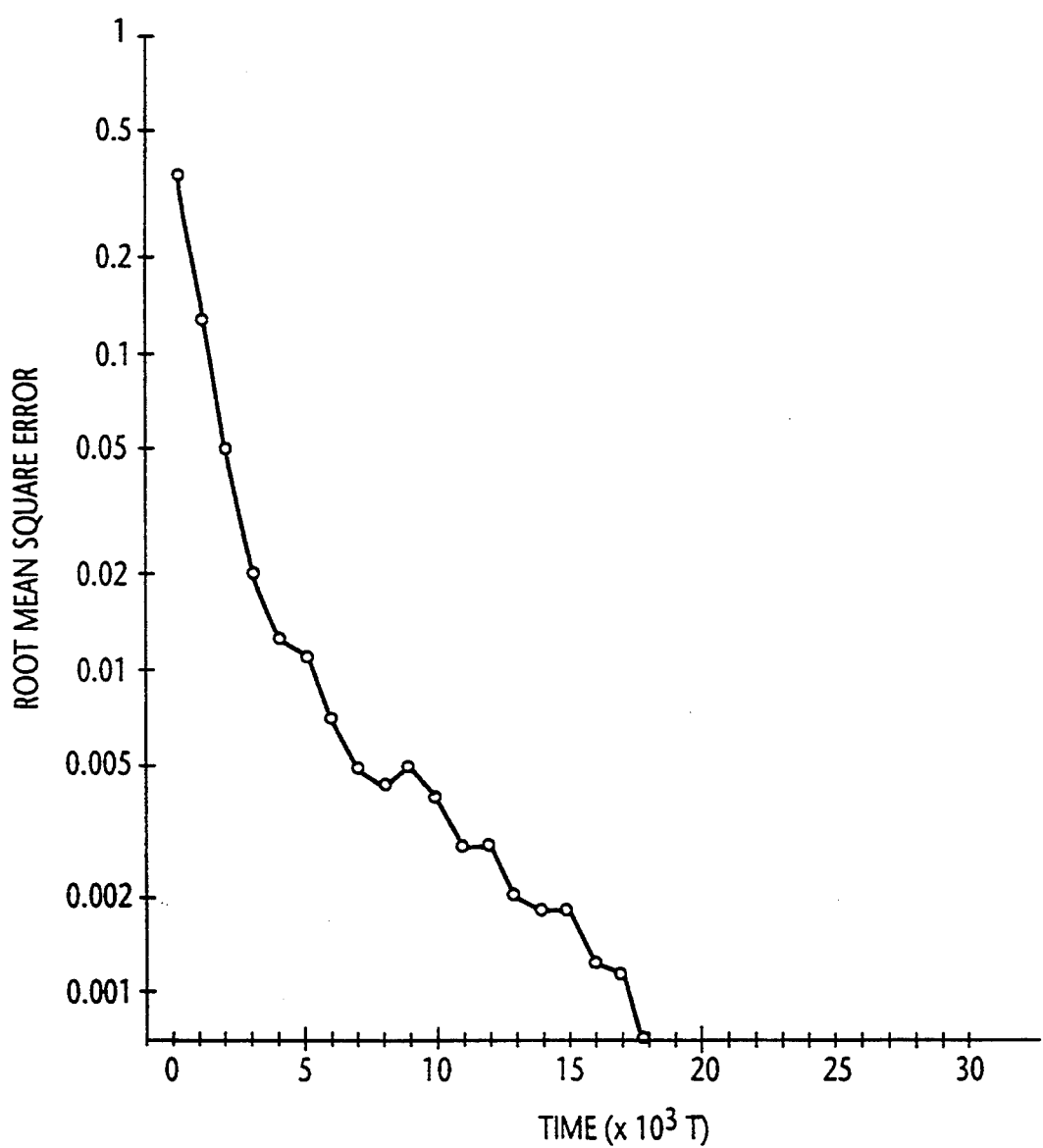
FIG. 5 is a graphic representation of a computer simulation of the root mean square error obtained by the embodiment of FIG. 4.

The result of a computer simulation on the residual intersymbol interference of the embodiment of FIG. 4 is shown in FIG. 5. While the convergence time is greater than that of the curve C of FIG. 3, the modified embodiment can be used to advantage because of the simplification of the IIR filter 25 if the increased in convergence time can be tolerated.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A decision feedback equalizer comprising:
   a subtractor having a first input for receiving an input digital signal and a second input for receiving a cancelling signal for cancelling an intersymbol interference component of said input digital signal;
   a decision circuit for making a binary decision on the output of said subtractor;
   an error detector connected between input and output of said decision circuit for detecting a decision error;
   a nonrecursive filter including a tapped delay line having an input end connected to the output of said decision circuit for producing a succession of nonrecursive tap signals, tap-gain multipliers for operating on said nonrecursive tap signals respectively, means for summing the outputs of said tap-gain multipliers and producing an output signal of the nonrecursive filter, and correlator means for detecting correlations between said nonrecursive tap signals and said decision error for controlling the tap gains of said tap-gain multipliers;
   a first recursive filter including a series of first and second delay-line taps, first and second tap-gain multipliers for respectively operating on signals at the first and second delay-line taps of the first recursive filter, means for summing the outputs of the first and second tap-gain multipliers and producing an output signal of the first recursive filter, third and fourth tap-gain multipliers for respectively operating on the outputs of the first and second delay-line taps of the first recursive filter, means for providing a sum of the outputs of the third and fourth tap-gain multipliers and the output of the tapped delay line of said nonrecursive filter and applying said sum to the first delay-line tap of the first recursive filter, and correlator means for detecting correlations between the inputs of said first and second delay-line taps of the first recursive filter and the decision error of said error detector for controlling the tap gains of said first and second tap-gain multipliers of the first recursive filter;

a second recursive filter including a series of first and second delay-line taps for receiving said output signal of said first recursive filter, weighing means for weighing the output of the second delay-line tap of the second recursive filter with an attenuation coefficient of constant value, and means for detecting a difference between the output of the weighing means and the output of the first delay-line tap of the second recursive filter to produce a difference signal, a series of third and fourth delay-line taps, third and fourth tap-gain multipliers for respectively operating on the outputs of said third and fourth delay-line taps of the second recursive filter, summing means for supplying a sum of the outputs of the third and fourth tap-gain multipliers of the second recursive filter and said difference signal to an input of the third delay-line tap of the second recursive filter to produce an output signal of the second recursive filter;

tap-gain control means for summing said attenuation coefficient of constant value with an attenuation coefficient of variable quantity to produce a positive feedback coefficient and multiplying said attenuation coefficient of constant value with said attenuation coefficient of variable quantity to produce a negative feedback coefficient, updating said attenuation coefficient of variable quantity with a correlation between said decision error and said output signal of said second recursive filter, and controlling the tap gains of said third tap-gain multipliers of said first and second recursive filters with said positive feedback coefficient and controlling the tap gains of said fourth tap-gain multipliers of said first and second recursive filters with said negative feedback coefficient; and an adder for supplying a sum of the output signals of said nonrecursive filter and the first recursive filter to the second input of said subtractor as said cancelling signal.

2. A decision feedback equalizer comprising:

a subtractor having a first input for receiving an input digital signal and a second input for receiving a cancelling signal for cancelling an intersymbol interference component of said input digital signal;

a decision circuit for making a binary decision on the output of said subtractor;

an error detector connected between input and output of said decision circuit for detecting a decision error;

a nonrecursive filter including a tapped delay line having an input end connected to the output of said decision circuit for producing a succession of nonrecursive tap signals, tap-gain multipliers for operating on said nonrecursive tap signals respectively, means for summing the outputs of said tap-gain multipliers and producing an output signal of the nonrecursive filter, and correlator means for detecting correlations between said nonrecursive tap signals and said decision error for controlling the tap gains of said tap-gain multipliers;

a first recursive filter including a series of first and second delay-line taps, first and second tap-gain multipliers for respectively operating on signals at the first and second delay-line taps of the first recursive filter, means for summing the outputs of the first and second tap-gain multipliers and producing an output signal of the first recursive filter, third and fourth tap-gain multipliers for respectively operating on the outputs of the first and second delay-line taps of the first recursive filter, means for providing a sum of the outputs of the third and fourth tap-gain multipliers and the output of the tapped delay line of said nonrecursive filter and applying said sum to the first delay-line tap of the first recursive filter, and correlator means for detecting correlations between the inputs of said first and second delay-line taps of the first recursive filter and the decision error of said error detector for controlling the tap gains of said first and second tap-gain multipliers of the first recursive filter;

a second recursive filter including summing means for summing said output signal of said first recursive filter with feedback signals to produce a sum signal, a series of first and second delay-line taps for receiving the sum signal of said summing means, first and second tap-gain multipliers for respectively operating on the outputs of said first and second delay-line taps of the second recursive filter and supplying the operated outputs to said summing means of the second recursive filter as said feedback signals, weighing means for weighing the output of the second delay-line tap of the second recursive filter with an attenuation coefficient of constant value, and means for detecting a difference between the output of the weighing means and the output of the first delay-line tap of the second recursive filter to produce a difference signal to produce an output signal of the second recursive filter;

tap-gain control means for summing said attenuation coefficient of constant value with an attenuation coefficient of variable quantity to produce a positive feedback coefficient and multiplying said attenuation coefficient of constant value with said attenuation coefficient of variable quantity to produce a negative feedback coefficient, updating said attenuation coefficient of variable quantity with a correlation between said decision error and said output signal of said second recursive filter, and controlling the tap gains of said third tap-gain multiplier of said first recursive filter and said first tap-gain multiplier of said second recursive filter with said positive feedback coefficient and controlling the tap gains of said fourth tap-gain multiplier of said first recursive filter and said second tap-gain multiplier of said second recursive filter with said negative feedback coefficient; and an adder for supplying a sum of the output signals of said nonrecursive filter and the first recursive filter to the second input of said subtractor as said cancelling signal.

3. A decision feedback equalizer comprising:

a subtractor having a first input for receiving an input digital signal and a second input for receiving a cancelling signal for cancelling an intersymbol interference component of said input digital signal;

a decision circuit for making a binary decision on the output of said subtractor;

an error detector connected between input and output of said decision circuit for detecting a decision error;

a nonrecursive filter including a tapped delay line having an input end connected to the output of said decision circuit for producing a succession of nonrecursive tap signals, tap-gain multipliers for operating on said nonrecursive tap signals respectively, means for summing the outputs of said tap-gain multipliers and producing an output signal of the nonrecursive filter, and correlator means for detecting correlations between said nonrecursive tap signals and said decision error for controlling the tap gains of said tap-gain multipliers;

a recursive filter including a series of first and second delay-line taps, first and second tap-gain multipliers for respectively operating on signals at the first and second delay-line taps of the recursive filter, means for summing the outputs of the first and second tap-gain multipliers and producing a first signal of the recursive filter, third and fourth tap-gain multipliers for respectively operating on the outputs of the first and second delay-line taps of the recursive filter, means for providing a sum of the outputs of the third and fourth tap-gain multipliers and the output of the tapped delay line of said nonrecursive filter and applying said sum to the first delay-line tap of the recursive filter, correlator means for detecting first and second correlations between the inputs of said first and second delay-line taps of the recursive filter and the decision error of said error detector for controlling the tap gains of said first and second tap-gain multipliers of the recursive filter, first weighing means for weighing the output of the second delay-line tap of the recursive filter with an attenuation coefficient of constant value, means for detecting a difference between the output of the first delay-line tap of the recursive filter and the output of the first weighing means, and second weighing means for weighing said difference with said first correlation detected by said correlator means of the recursive filter to produce a second output signal of the recursive filter;

tap-gain control means for summing said attenuation coefficient of constant value with an attenuation coefficient of variable quantity to produce a positive feedback coefficient and multiplying said attenuation coefficient of constant value with said attenuation coefficient of variable quantity to produce a negative feedback coefficient, updating said attenuation coefficient of variable quantity with a correlation between said decision error and said second output signal of said recursive filter, and controlling the tap gain of said third tap-gain multiplier of said recursive filter with said positive feedback coefficient and controlling the tap gain of said fourth tap-gain multiplier of said recursive filter with said negative feedback coefficient; and an adder for supplying a sum of the output signal of said nonrecursive filter and the first output signal of the recursive filter to the second input of said subtractor as said cancelling signal.

* * * * *

UNITED STATES PATENT AND TRADEMARK OFFICE
CERTIFICATE OF CORRECTION

PATENT NO. : 5,440,583
DATED : August 8, 1995
INVENTOR(S) : Shin'Ichi Koike

It is certified that error appears in the above-indentified patent and that said Letters Patent is hereby corrected as shown below:

Column 5, lines 6 and 7 delete "u(n-1) and u(n-2)", insert --$u_{(n-1)}$ and $u_{(n-2)}$--

Column 5, line 39 delete "-$Z_{i(n)}$", insert --$\hat{z}_{i(n)}$--

Column 5, line 42 delete "$Z_{i(n)}$", insert --$\hat{z}_{i(n)}$--

Column 5, line 45, delete "$Z_{i(n)}$", insert --$\hat{z}_{i(n)}$--

Column 5, line 53, delete "$de^{2}_{i(n)}$" insert --$de_{i(n)}^{2}$--.  and delete "$dz_{i(n)}$", insert --$d\hat{z}_{i(n)}$--

UNITED STATES PATENT AND TRADEMARK OFFICE
CERTIFICATE OF CORRECTION

PATENT NO. : 5,440,583

DATED : August 8, 1995

INVENTOR(S) : Shin'Ichi Koike

It is certified that error appears in the above-indentified patent and that said Letters Patent is hereby corrected as shown below:

Column 6, line 3 delete "$dz_{i(n)}$" insert --$d\hat{z}_{i(n)}$--

Column 6, line 31 delete "P n", insert --$P_n$--

Column 6, line 44 delete "$z_{i(n-1)} -r_f z_{i(n-2)}$", insert --$\hat{z}_{i(n-1)} -r_f \hat{z}_{i(n-2)}$--

Column 6, line 57 delete "$z_{i(n-1)}$ and $z_{i(n-2)}$", insert --$\hat{z}_{i(n-1)}$ and $\hat{z}_{i(n-2)}$--

Column 7, line 15 delete "$z_{i(n)}$" insert --$\hat{z}_{i(n)}$--

Column 7, line 59 delete "$z_{f(n)}$", insert --$\hat{z}_{f(n)}$--

Column 11, line 26 after "first", insert --output--.

Signed and Sealed this

Twenty-seventh Day of August, 1996

Attest:

BRUCE LEHMAN

Attesting Officer    Commissioner of Patents and Trademarks